US011720911B2

(12) United States Patent
Mehrotra et al.

(10) Patent No.: US 11,720,911 B2
(45) Date of Patent: Aug. 8, 2023

(54) METHODS AND APPARATUS FOR ELECTRONICALLY DETERMINING ITEM PRICING

(71) Applicant: Walmart Apollo, LLC, Bentonville, AR (US)

(72) Inventors: Prakhar Mehrotra, Sunnyvale, CA (US); Yixian Chen, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 150 days.

(21) Appl. No.: 16/749,246

(22) Filed: Jan. 22, 2020

(65) Prior Publication Data
US 2021/0224835 A1 Jul. 22, 2021

(51) Int. Cl.
*G06Q 10/00* (2023.01)
*G06Q 30/0201* (2023.01)
*G06Q 30/0601* (2023.01)
*G06Q 30/0207* (2023.01)

(52) U.S. Cl.
CPC ..... *G06Q 30/0206* (2013.01); *G06Q 30/0201* (2013.01); *G06Q 30/0223* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,564,189 B1 | 5/2003 | Nycz | |
| 7,240,027 B2 | 7/2007 | McConnell et al. | |
| 7,321,865 B2 | 1/2008 | Kelly | |
| 7,349,876 B1 * | 3/2008 | Veach | G06Q 30/02 705/35 |
| 7,379,922 B2 | 5/2008 | Pericle | |

(Continued)

OTHER PUBLICATIONS

Azeddine Zemzam et al. and Mohammed El Maataoui et al. (Inventory management of supply chain with robust control theory: literature review, Int. J. Logistics Systems and Management, vol. 27, No. 4, 2017). (Year: 2017).*

(Continued)

*Primary Examiner* — Hafiz A Kassim
(74) *Attorney, Agent, or Firm* — Morgan, Lewis & Bockius LLP; Manita Rawat

(57) ABSTRACT

This application relates to apparatus and methods for automatically determining and providing prices for items for sale in stores or online such as to clear inventor of the items. In some examples, a computing device employs artificial intelligence, such as machine learning models, to determine the pricing of the items. For example, the computing device may employ a forecasting model that determines a forecasted demand for an item based on store inventory and experimental sales of the item. The computing device may also employ an item pricing optimization model that determines a clearance price for the item based at least on the forecasted demand as well as historical data indicating previous price adjustments and sales of the item. In some examples, the item pricing optimization model determines a time period to apply the clearance price to the item. The item may then be placed on sale for the clearance price.

14 Claims, 7 Drawing Sheets

(56) References Cited

U.S. PATENT DOCUMENTS

| | | | | |
|---|---|---|---|---|
| 7,543,743 | B1* | 6/2009 | Yu | G06Q 10/087 |
| | | | | 705/28 |
| 7,740,172 | B1* | 6/2010 | Hubert | G06Q 30/02 |
| | | | | 235/383 |
| 8,321,303 | B1* | 11/2012 | Krishnamurthy | G06Q 30/02 |
| | | | | 705/28 |
| 8,458,010 | B1* | 6/2013 | Geoffrin | G06Q 30/0238 |
| | | | | 705/7.29 |
| 8,666,847 | B1 | 3/2014 | Blank et al. | |
| 8,706,554 | B1* | 4/2014 | Whitler | G06Q 20/202 |
| | | | | 705/16 |
| 9,818,082 | B1* | 11/2017 | Sadighian | G06Q 10/087 |
| 9,898,713 | B1 | 2/2018 | Blank et al. | |
| 2005/0197909 | A1* | 9/2005 | Klenske | G06Q 30/0241 |
| | | | | 705/7.29 |
| 2006/0206386 | A1* | 9/2006 | Walker | G06Q 20/202 |
| | | | | 705/21 |
| 2006/0242154 | A1* | 10/2006 | Rawat | G06F 16/168 |
| 2010/0070338 | A1* | 3/2010 | Siotia | G06Q 30/0223 |
| | | | | 705/7.31 |
| 2011/0125605 | A1* | 5/2011 | Chatter | G06Q 30/08 |
| | | | | 705/26.3 |
| 2011/0288925 | A1* | 11/2011 | Thomas | G06Q 30/0201 |
| | | | | 705/14.25 |
| 2011/0295722 | A1* | 12/2011 | Reisman | G06Q 30/0641 |
| | | | | 705/26.1 |
| 2012/0173323 | A1* | 7/2012 | Barlow | G06Q 30/0223 |
| | | | | 705/14.24 |
| 2013/0073410 | A1* | 3/2013 | Bhogal | G06Q 30/08 |
| | | | | 705/26.3 |
| 2014/0257912 | A1* | 9/2014 | Hsieh | G06Q 10/06315 |
| | | | | 705/7.25 |
| 2014/0279208 | A1* | 9/2014 | Nickitas | G06Q 30/0631 |
| | | | | 705/26.7 |
| 2014/0330633 | A1* | 11/2014 | Moran | G06T 3/0006 |
| | | | | 705/14.43 |
| 2014/0351100 | A1* | 11/2014 | Kapoor | G06Q 10/0631 |
| | | | | 705/28 |
| 2016/0092772 | A1* | 3/2016 | Srivastava | G06F 16/951 |
| | | | | 706/12 |
| 2017/0039512 | A1* | 2/2017 | Jones | G06Q 10/087 |
| 2017/0262926 | A1* | 9/2017 | High | G06F 16/22 |
| 2017/0330123 | A1* | 11/2017 | Deshpande | G06N 7/005 |
| 2018/0204175 | A1* | 7/2018 | Vasantham | G06Q 20/203 |
| 2018/0308030 | A1* | 10/2018 | Nemati | G06N 20/00 |
| 2019/0108538 | A1* | 4/2019 | Montero | G06Q 30/0211 |
| 2019/0244230 | A1* | 8/2019 | Subramanian | G06Q 10/02 |
| 2019/0259043 | A1* | 8/2019 | Koneri | G06N 7/005 |
| 2019/0325387 | A1* | 10/2019 | Perry | G06Q 30/06 |
| 2019/0347607 | A1* | 11/2019 | Shi | G06N 3/0481 |
| 2020/0219042 | A1* | 7/2020 | Gaurav | G06Q 10/087 |
| 2020/0342475 | A1* | 10/2020 | Wu | G06Q 30/0204 |
| 2021/0089944 | A1* | 3/2021 | Zhou | G06Q 10/04 |
| 2021/0103945 | A1* | 4/2021 | Montero | G06Q 30/0269 |

OTHER PUBLICATIONS

Stephen A. Smith and Narendra Agrawal (Management of Multi-Item Retail Inventory Systems with Demand Substitution, Operations Research, Jan.-Feb. 2000, vol. 48, No. 1, INFORMS). (Year: 2000).*

Frank Schneider and Diego Klabjan (Inventory control in multi-channel retail, European Journal of Operational Research 227 (2013) 101-111). (Year: 2013).*

Granin S. and Mandel A. (Simulation of Inventory Control Process for Supply Chain with Several Suppliers, 2017 IEEE). (Year: 2017).*

Garrett A. Johnson, Randall A. Lewis, and David H. Reiley et al. (Location, Location, Location: Repetition and Proximity Increase Advertising Effectiveness, Simon Business School, University of Rochester, Mar. 5, 2015). (Year: 2015).*

Eric T. Anderson and Duncan Simester et al. (A Step-by-Step Guide to Smart Business Experiments, Harvard Business Review, (Mar. 2011)). (Year: 2011).*

James Brian Quinn (The intelligent enterprise a new paradigm, Academy of Management Executive. 2005. vol. 19. No. 4). (Year: 2005).*

Black et al., "The Pricing of Options and Corporate Liabilities". Journal of Political Economy. 81(3) 1973, pp. 637-654.

Mnih et al., "Playing Atari with Deep Reinforcement Learning", Machine Leamig arXiv:1312.5602, (2013) pp. 1-9.

* cited by examiner

METHODS AND APPARATUS FOR ELECTRONICALLY DETERMINING ITEM PRICING

TECHNICAL FIELD

The disclosure relates generally to determining item pricing and, more specifically, to electronically determining and providing item prices for items sold in stores and online.

BACKGROUND

At least some retailers determine the pricing of items sold through various sales channels, such as stores (e.g., brick-and-mortar stores) and websites. Sometimes, retailers may decide to adjust the price of an item. For example, if an item is selling well, the retailer may increase the price of the item in an attempt to increase revenue. As another example, if an item is not selling well, the retailer may lower the price of the item in an attempt to sell more of the item. In some examples, a retailer may want to clear inventory of an item. For example, a retailer selling an item at a store may attempt to "clear the isle" of an item. The retailer may want to clear the inventor of the item, for example, to make room for another item, or because the item is an older model being replaced with a newer model. Similarly, a retailer selling an item online may store inventor of an item in a warehouse. The retailer may wish to sell all inventory of the item to make room in the warehouse for another item, or because the item is an older model, for example. As such, the retailer may place the item on "clearance," in which case the retailer typically reduces (e.g., greatly reduces) the price of the item. In some cases, the retailer fails to sell all of the inventory of the item. In other cases, the retailer may sell all of the inventory of the item, but fails to realize additional revenues from selling the item. As such, there are opportunities to address the determination of item prices when attempting to clear inventory of the items.

SUMMARY

The embodiments described herein are directed to automatically determining and providing item prices for items for sale in stores or online when attempting to clear inventor of the items. The embodiments employ one or more models, such as machine learning models, to determine the item prices. In some examples, the embodiments also determine when to adjust the price of an item (e.g., place an item on clearance). In some examples, the embodiments may determine item prices such as to avoid excess inventory of the item. The embodiments can be item category agnostic, allowing a retailer to determine item prices across a wide variety of item categories. As such, the embodiments allow a retailer to price items efficiently during clearance events. For example, the embodiments may allow a retailer to price an item such that all of the inventory for the item is sold while increasing (e.g., maximizing) revenue from selling the item. In addition to or instead of these example advantages, persons of ordinary skill in the art having the benefit of these disclosures may recognize and appreciate other advantages as well.

In accordance with various embodiments, exemplary systems may be implemented in any suitable hardware or hardware and software, such as in any suitable computing device. For example, in some embodiments, a computing device employs artificial intelligence, such as machine learning models, to determine the pricing of the items. For example, the computing device may employ a forecasting model that determines a forecasted demand for an item based on store inventory and experimental sales of the item. The computing device may also employ an item pricing optimization model that determines a clearance price for the item based at least on the forecasted demand as well as historical data indicating previous price adjustments and sales of the item. In some examples, the item pricing optimization model determines a time period to apply the clearance price to the item. The item may then be placed on sale for the clearance price.

In some embodiments, a computing device is configured to receive a request for a price for an item for a sales channel. The sales channel may be a store, or a website, for example. The computing device may also be configured to obtain experimental sales data for the first item from a database. The computing device may be configured to determine a demand for the item at the sales channel based on the experimental sales data. The computing device may be further configured to determine a current inventory level of the item at the sales channel. The computing device may be configured to determine a price for the item at the sales channel based on the demand for the item and the current inventory level of the item at the sales channel. The computing device may also be configured to transmit the price for the item.

In some examples, the computing device is configured to determine a confidence value corresponding to the price for the item. The computing device may also be configured to determine that the confidence value is not beyond a threshold, and transmit the price for the item to a plurality of test stores.

In some examples, the computing device is configured to obtain sales transaction data identifying sales transactions for the item at the plurality of test stores. The computing device may also be configured to determine a second demand for the item based on the sales transaction data. Further, the computing device may be configured to determine a second current inventory level of the item at the sales channel. The computing device may also be configured to determine a second price for the item at the sales channel based on the second demand for the item and the second current inventory level of the item at the sales channel. The computing device be further configured to transmit the second price for the item.

In some embodiments, a method is provided that includes receiving a request for a price for an item for a sales channel. The method may include obtaining experimental sales data for the first item from a database. The method may also include determining a demand for the item at the sales channel based on the experimental sales data. The method may include determining a current inventory level of the item at the sales channel. The method may further include determining a price for the item at the sales channel based on the demand for the item and the current inventory level of the item at the sales channel. The method may also include transmitting the price for the item.

In some examples, the method includes determining a confidence value corresponding to the price for the item, and determining that the confidence value is not beyond a threshold. The method may also include transmitting the price for the item to a plurality of test stores.

In some examples, the method includes obtaining sales transaction data identifying sales transactions for the item at the plurality of test stores. The method may also include determining a second demand for the item based on the sales transaction data. The method may further include determining a second current inventory level of the item at the sales channel. The method may also include determining a second price for the item at the sales channel based on the second demand for the item and the second current inventory level of the item at the sales channel. The method may include transmitting the second price for the item.

In yet other embodiments, a non-transitory computer readable medium has instructions stored thereon, where the instructions, when executed by at least one processor, cause a computing device to perform operations that include receiving a request for a price for an item for a sales channel. The operations may include obtaining experimental sales data for the first item from a database. The operations may also include determining a demand for the item at the sales channel based on the experimental sales data. The operations may include determining a current inventory level of the item at the sales channel. The operations may further include determining a price for the item at the sales channel based on the demand for the item and the current inventory level of the item at the sales channel. The operations may also include transmitting the price for the item.

In some examples, the operations include determining a confidence value corresponding to the price for the item, and determining that the confidence value is not beyond a threshold. The operations may also include transmitting the price for the item to a plurality of test stores.

In some examples, the operations include obtaining sales transaction data identifying sales transactions for the item at the plurality of test stores. The operations may also include determining a second demand for the item based on the sales transaction data. The operations may further include determining a second current inventory level of the item at the sales channel. The operations may also include determining a second price for the item at the sales channel based on the second demand for the item and the second current inventory level of the item at the sales channel. The operations may include transmitting the second price for the item.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
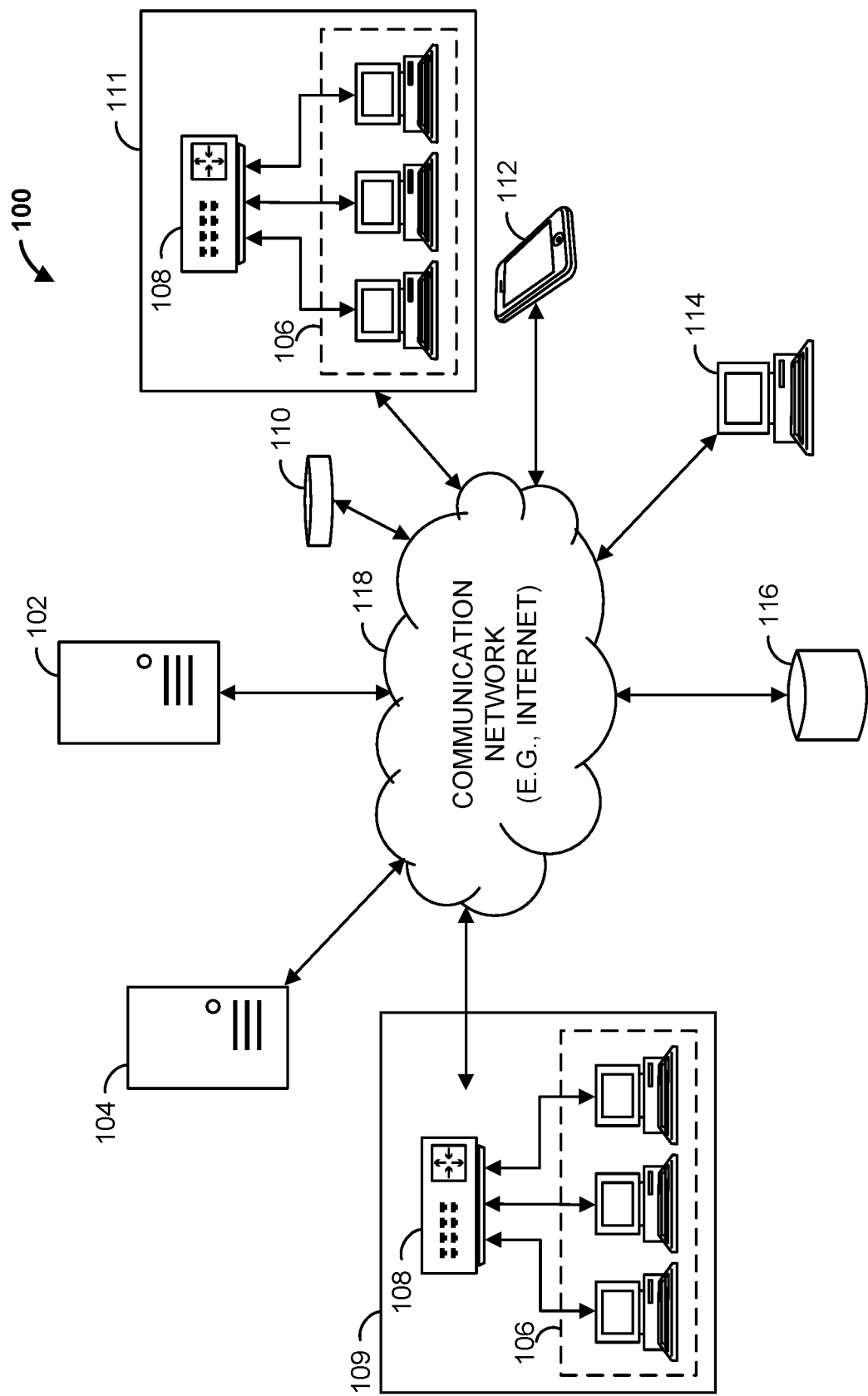
FIG. 1 is a block diagram of an item price determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments described herein employ models such as machine learning models (e.g., deep learning models), to determine item prices and/or timing to clear excess item inventory. For example, the embodiments may employ a forecasting model, and an item price optimization model. The forecasting model predict demand for an item. For example, the forecasting model may predict customer demand for an item sold at a particular store during a particular period of time. The store may be one of a plurality of stores operated by a retailer, for example. The period of time can be a month, a season, a holiday, a holiday season, or any other period of time.

For example, the forecasting model may receive an indication of an item needing to be cleared from inventory at a particular store. The forecasting model may obtain experimental data for the item, which identifies previous transactions (e.g., sales) resulting from experimentally pricing the item at one or more levels. The experimental data may also include previous inventory data for the item, such as inventories during the experimental sales. The forecasting model may also obtain a discount depth for the item. The discount depth is a percentage of a discount for an item from an original price. For example, if an original price for an item is $100, and a clearance price for the same item is $90, then discount depth is 10% (e.g., ($100−$90)/$100=10%). Based on one or more of the experimental data and the discount depth, the forecasting model may predict a demand for the item at the store. The predicted demand for an item at one store can be different than the predicted demand for the same item at another store, for example.

The item price optimization model obtains the predicted demand for the item from the forecasting model, and also obtains historical transaction data, such as data indicating one or more previous price adjustments (e.g., reductions) for the item and corresponding sales data. The item price optimization model may also obtain store inventory data identifying current or expected inventory of the item at the store. The optimization model may further obtain a modular date for the item. The modular date may be an expiration date of a modular at a store, where the modular defines what items are on shelves at a store. For example, the modular date can be an end date of when an item should remain on a shelf at a store. After the modular date, items on the modular should be removed from shelves and may be replaced by new items. Thus, for example, a store would ideally sell all items on a modular before the modular date.

The item price optimization model may determine a recommended price (e.g., clearance price) for the item based on one or more of the predicted demand for the item, the historical transaction data, the inventory data, and the modular date. In some examples, the item price optimization model may also determine a period of time as to when the price adjustment should be made for the item at the store. The item price and/or period of time may be transmitted to the store. The store may then update the item price for the item, such as by replacing a sticker with the price on the item with a new sticker showing the updated price. In some examples, the item is advertised with the new price. For example, the item may be advertised with the new price on a website for the retailer, on television, or in communications, such as short message service (SMS) communications, texts, or emails.

The forecasting model can similarly predict demand for an item sold online (e.g., on a retailer's website) during a particular period of time. Based on at least the predicted demand for the item sold online, the item price optimization model can also generate a price adjustment for the item. The price of the item may be updated with the price adjustment, such as during a clearance event. The item may be advertised, such as on a retailer's website, with the updated price. In some examples, the item price optimization model can also determine a period of time as to when to make the price adjustment to the item.

Turning to the drawings, FIG. 1 illustrates a block diagram of an item price determination system 100 that includes a price determination computing device 102 (e.g., a server, such as an application server), a web server 104, workstations 106, database 116, and multiple customer computing devices 110, 112, 114 operatively coupled over network 118. Price determination computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, price determination computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, price determination computing device 102 is operated by a retailer, and multiple customer computing devices 112, 114 are operated by customers of the retailer.

Workstations 106 are operably coupled to communication network 118 via router (or switch) 108. Workstations 106 and/or router 108 may be located at one of a first store 109 or second store 111, for example. Workstations 106 can communicate with price determination computing device 102 over communication network 118. The workstations 106 may send data to, and receive data from, price determination computing device 102. For example, the workstations 106 may transmit data related to an order purchased by a customer at first store 109 (or second store 111) to price determination computing device 102.

In some examples, price determination computing device 102 may determine and transmit item prices, such as item clearance prices, to workstations 106. For example, price determination computing device 102 may receive from first store 109 (e.g., via workstation 106) a request for a clearance price for an item sold at first store 109. Price determination computing device 102 may determine the clearance price, and transmit data indicating the clearance price to first store 109. The price of the item may then be updated to the clearance price at first store 109.

Web server 104 can be any suitable computing device that can host a website, such as an online marketplace. For example, web server 104 can a website for a retailer that sells items online, such as a retailer's online marketplace. The website may allow a customer to view and purchase items. For example, the website may display the items, along with a price for each item. The website may allow the customer to purchase the item for the displayed price. In some examples, the item is shipped to the customer (e.g., to an address provided by the customer). In some examples, the website may allow the customer to pick up the items at a store location, such as at first store 109 or second store 111.

In some examples, price determination computing device 102 receives from web server 104 a request for a clearance price for an item sold at the website hosted by web server 104. Price determination computing device 102 may determine the clearance price, and transmit data indicating the clearance price to web server 104. In response, web server 104 may update the price of the on the website to the clearance price.

In some examples, web server 104 transmits user transaction data for one or more customers to price determination computing device 102. User transaction data may identify, for example, purchase transactions (e.g., the purchase of items) made by the customers on a website hosted by web server 104.

First customer computing device 110, second customer computing device 112, and N$^{th}$ customer computing device 114 may communicate with web server 104 over communication network 118. For example, each of multiple computing devices 110, 112, 114 may be operable to view, access, and interact with webpages of a website hosted by web server 104 and/or web server 105. In some examples, web server 104 hosts a website for an online marketplace of a retailer that allows for the purchase of items. The website may display items for sale, as well as the prices to purchase the items. A customer operating of one of multiple computing devices 110, 112, 114 may access the website hosted by web server 104, add one or more items to an online shopping cart of the website, and perform an online checkout of the shopping cart to purchase the items.

Although FIG. 1 illustrates three customer computing devices 110, 112, 114, item price determination system 100 can include any number of customer computing devices 110, 112, 114. Similarly, item price determination system 100 can include any number of web servers 104, stores 109, 111, workstations 106, item recommendation computing devices 102, and databases 116.

Price determination computing device 102 is operable to communicate with database 116 over communication network 118. For example, price determination computing device 102 can store data to, and read data from, database 116. Database 116 can be a remote storage device, such as a cloud-based server, a memory device on another application server, a networked computer, or any other suitable remote storage. Although shown remote to price determination computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, price determination computing device 102 receives a request from workstation 106 at, for example, first store 109, to determine a clearance price for an item. The request may identify the item (e.g., using an item identification (ID)) and, in some examples, a period of time of when the item is to be on sale for the clearance price. The period of time may be a month of the year, a season, a holiday, a holiday season, a date range, or any other period of time. The request may, in some examples, also identify a current price of the item, and a discount depth for the item.

In response to receiving the request, price determination computing device 102 may obtain experimental data associated with the item. For example, the experimental data may be stored in database 116. The experimental data identifies and characterizes previous transactions (e.g., sales) of the item resulting from experimentally pricing the item at one or more levels. For example, the experimental data by identify previous transactions at "test stores." The test stores may be a subset (e.g., a small subset such as 5%) of all stores for a retailer. The experimental data may also include previous inventory data for the item, such as store inventories for each of a plurality of stores during an experimental sale.

Price determination computing device 102 may execute a forecasting model (e.g., forecasting algorithm) to generate item demand data indicating a predicted demand for the item at first store 109. For example, price determination computing device 102 may implement the forecasting model to map a price-time-demand relationship. The predicted demand may include an amount (e.g., number) of the item predicted to be sold over a period of time, such as over the period of time received in the request. The predicted demand is specific to a particular store. For example, a predicted demand for an item over a period of time at first store 109 may not be the same as a predicted demand for the item over the same period of time at store 111.

Price determination computing device 102 may provide the forecasting model with the item and associated experimental data as input, and may execute the forecasting model to generate the item demand data. The forecasting model may be based, for example, on a machine learning algorithm. In some examples, the forecasting model is trained with historical transaction data for purchases of items at a particular store, such as first store 109 and second store 111. The historical transaction data may identify the items sold, and the prices of the sold items. The historical transaction data may also identify store inventory levels of the items when the transactions were executed.

Once item demand data is generated, price determination computing device 102 may execute an item price optimization model to determine a clearance price for the item. The item price optimization model may be based on a machine learning algorithm, for example. Price determination computing device 102 may provide the item price optimization model with the generated item demand data as input, as well as historical transaction data identifying sales of the item during previous price markdown periods. In some examples, price determination computing device 102 also provides the item price optimization model with a modular date (e.g., new modular date) as input. Based on one or more of the item demand data, historical transaction data, the period of time received in the request, and the modular date, execution of the item price optimization model generates item price data indicating a clearance price for the item. In some examples, execution of the item price optimization model also generates time period data indicating a suggested period of time to update the price of the item with the clearance price.

In some examples, the item price optimization model is trained with historical transaction data for purchases of items at one or more stores, such as first store 109 and second store 111. The historical transaction data may identify the items sold, and the prices of the sold items. The historical transaction data may also identify store inventory levels of the items when the transactions were executed. The item price optimization model may also be trained with the output of the forecasting model, e.g., data indicating a predicted demand.

In some examples, one or more of the forecasting model and the item price optimization model include a discrete time stochastic control process, such as a Markov decision process (MDP), which is based on a mathematical framework for modeling decision making. For example, a mathematical framework for decision making/optimization is a reinforcement learning algorithm. This option may be employed to determine multiple clearance prices when one clearance price is not optimal. For example, a stochastic demand paradigm may be determined based on correlations between different price periods. With multiple opportunities to iteratively reduce prices, a finite horizon Markov decision process (MDP) is proposed with a finite set of:

States S, where $(s_j)$ is the vector of feature values for product j;

Actions A, where $(a_j)$ is the markdown percentage;

Rewards R, where $(r_j)$ is a value obtained from the reward function in the form of revenue minus costs; and Transition probability, where $P(s_j',r_j|s_j,a_j)$ is a probability that given $a_j$ markdown percentage in state $s_j$ will lead to state $s_j'$.

Under this MDP environment, data can be collected to build a forecasting model to simulate store dynamics and further, by exploring actions (e.g., prices) at random, or by following a certain policy of actions, these simulations can be employed to augment the data and reduce the cost of running experiments. In one example, a Value-Iteration method may be employed to derive an optimal policy. The method may start with randomly initializing Action-value $Q\{\pi(s_j, a_j)\}$, which yields an expected discounted reward $(R_{j,t})$ when starting from states $s_j$, choosing action $a_j$ and using policy π for all time steps, and recursively iterating to get an optimal Q* as well as an optimal policy π*. By structuring the search to explore and exploit the sequence of actions given an initial state, the action value may be optimized according to the following equation:

$$\text{Maximize } Q\{\pi(s_j,a_j)\}=E_\pi[R_{j,t}|s_{j,t}=s_j,a_{j,t}=a_j] \quad \text{(eq. 1)}$$

$$\text{such that: } \Sigma_{a_j}\pi(s_j,a_j)=1 \quad \text{(eq. 2)}$$

Price determination computing device 102 may alternatively or additionally receive a request from web server 104 to determine a clearance price for an item sold on a website hosted by web server 104, such as a retailer's website. Price determination computing device 102 may execute the forecasting model as discussed above to generate item demand data identifying a demand for the item on the website during a period of time. Price determination computing device 102 may then execute the item price optimization model to determine the item price data indicating a clearance price for the item. Price determination computing device 102 may transmit the clearance price to the web server 104. Web server 104 may then update the price of the item with the clearance price. In some examples, execution of the item price optimization model also generates time period data indicating a suggested period of time to update the price of the item with the clearance price. Price determination computing device 102 may transmit the time period data to web server 104, and web server 104 may update the price of the item on the website to the clearance price during the time period.

Figure 2:
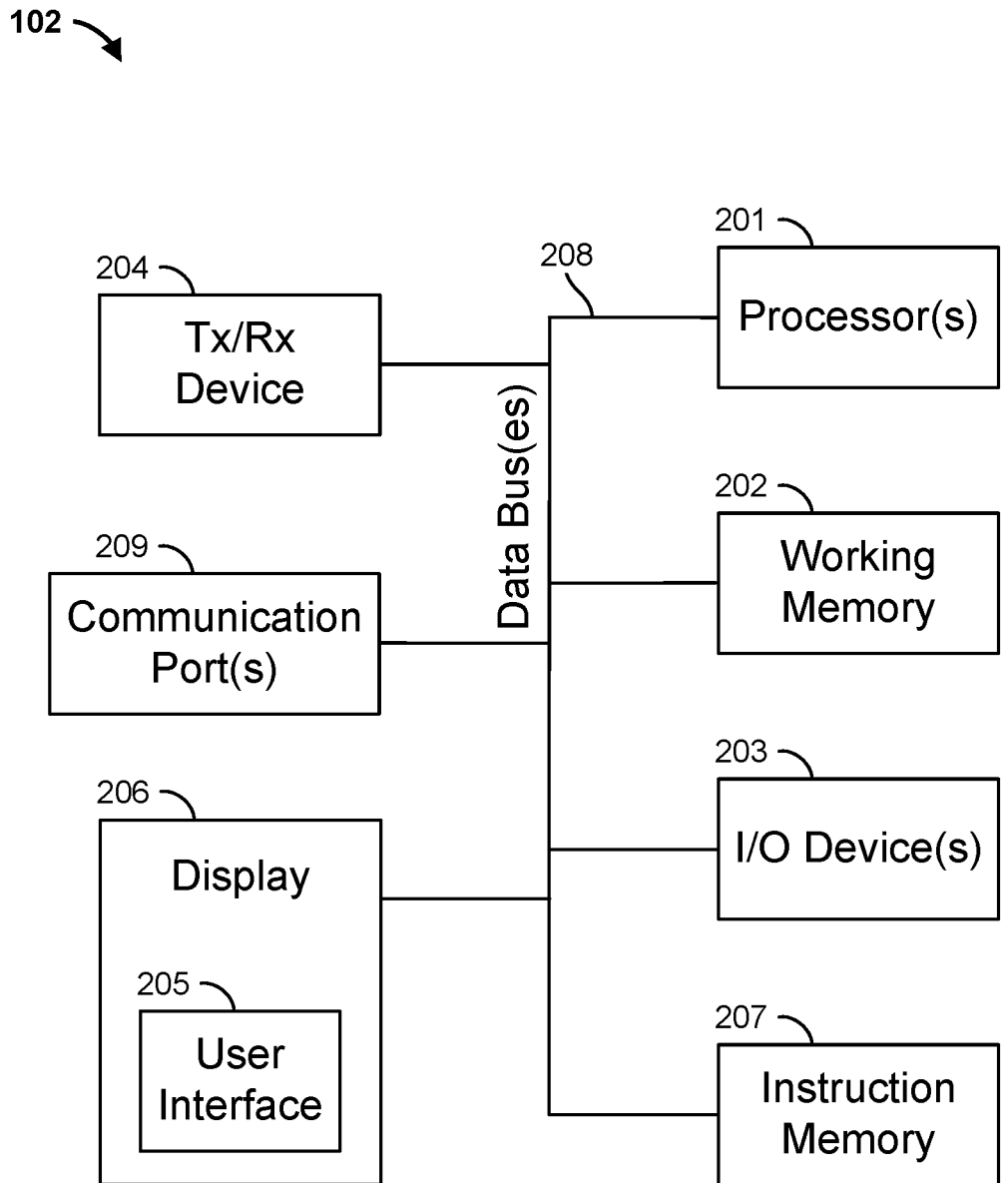
FIG. 2 is a block diagram of the price determination computing device of the item price determination system of FIG. 1 in accordance with some embodiments.

FIG. 2 illustrates the price determination computing device 102 of FIG. 1. Price determination computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of price determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with price determination computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 price determination computing device 102 will be operating in. Processor(s) 201 is operable to receive data from, or send data to, a network, such as communication network 118 of FIG. 1, via transceiver 204.

Figure 3:
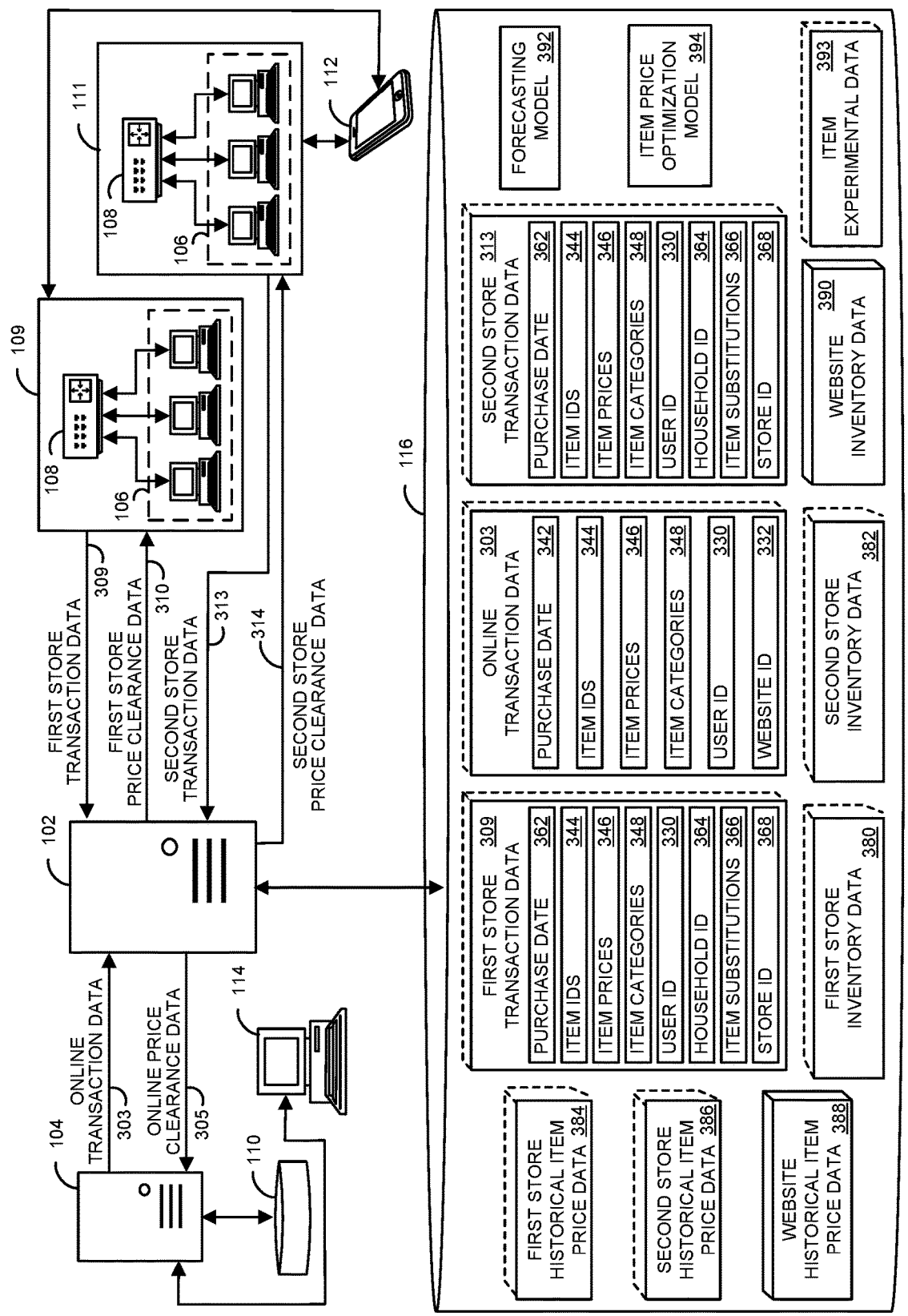
FIG. 3 is a block diagram illustrating examples of various portions of the item price determination system of FIG. 1 in accordance with some embodiments.

FIG. 3 is a block diagram illustrating examples of various portions of the item price determination system 100 of FIG. 1. As illustrated in FIG. 3, price determination computing device 102 can receive first store transaction data 309 from store 109. First store transaction data 309 may identify and characterize purchase transactions conducted by customers at first store 109. In some examples, the customers may pay for purchased items with one of multiple customer computing devices 110, 112, 114. For example, the customers may pay using a retailer's application executing on one of multiple customer computing devices 110, 112, 114. First store transaction data 309 may include, for each transaction, a purchase date 342, item IDs 344, item prices 346, item categories 348 (e.g., a category and/or subcategory for each item), a user ID 330, a household ID 364 (e.g., an address, a phone number, or any other household identifier), item substitutions 366 (e.g., an item that was substituted for an original item (e.g., due to being out of stock)), and a store ID 368. Price determination computing device 102 may aggregate and store first store transaction data 309 in database 116.

Similarly, price determination computing device 102 may receive second store transaction data 313 from second store 111. Price determination computing device 102 may similarly aggregate and store second store transaction data 313 in database 116.

Price determination computing device 102 may also receive online transaction data 303 from web server 104. Online transaction data 303 may identify and characterize purchase transactions made by customers on a website hosted by web server 104. For example, a customer may access a retailer's online marketplace hosted by web server 104 using one of multiple customer computing devices 110, 112, 114. The online marketplace may display items, and prices of items. The online marketplace may further allow the customer to purchase one or more items for the advertised prices. For each purchase transaction, web server 104 may generate and transmit online transaction data 303. Online transaction data 303 can include, for example, a purchase date 342, item IDs 344, item prices 346, item categories 348, a user ID 330, and a website ID 332 (e.g., a website IP address or URL). Price determination computing device 102 may aggregate online transaction data 303 for each website, and store the aggregated online transaction data 303 in database 116.

Price determination computing device 102 may also store in database 116 first store historical item price data 384, which identifies historical items prices (and, in some examples, sales of the items at each historical item price) for each of a plurality of items at first store 109. For example, first store historical item price data 384 may identify an item price, and a period of time (e.g., date range) of when the item price was in effect, for each of the plurality of items. Similarly, price determination computing device 102 may also store in database 116 store second store historical item price data 386, which identifies historical items prices (and, in some examples, sales of the items at each historical item price) for each of a plurality of items at second store 111. Likewise, price determination computing device 102 may also store in database 116 website historical item price data 388 for one or more websites, which identifies historical items prices (and, in some examples, sales of the items at each historical item price) for each of a plurality of items at a website, such as a retailer's website hosted by web server 104.

Price determination computing device 102 may further store first store inventory data 380 in database 116. First store inventory data 380 identifies current and previous inventory levels of items at first store 109. For example, first store inventory data 380 may identify a previous price of an item, an amount of an item in inventory when a previous price of the item took effect, and a period of time of when the previous price of the time was in effect. First store inventory data 380 may also identify a current price of an item, a current inventory level for the item, an inventory level of the item when the current price went into effect, and a point in time (e.g., a date) of when the current price when into effect.

Similarly, price determination computing device 102 may store second store inventory data 382 in database 116, which identifies current and previous inventory levels of items at second store 111. Price determination computing device 102 may further store website inventor data 390 in database 116, which identifies current and previous inventory levels of items sold on the corresponding website.

Price determination computing device 102 may also store in database 116 item experimental data 393, which identifies and characterizes experimental sales and price data for a plurality of items. For example, item experimental data 393 may identify experimental sales and price data for items sold at first store 109, second store 111, and one or more websites hosted by web server 104.

As illustrated in FIG. 3, database 116 stores forecasting model 392 and item price optimization model 394. In some examples, forecasting model 392 identifies and characterizes a trained machine learning algorithm that, when executed, generates predicted demand data. The predicted demand data may identify a predicted demand for a particular store or website, for example. In other examples, forecasting model 392 identifies and characterizes a discrete time stochastic control process, such as an MDP, that when executed generates predicted demand data. Forecasting model 392 may operate on one or more of experimental data (such as item experimental data 393), store inventory (such as first store inventory data 380 or second store inventory data 382), and discount depth to generate the predicted demand data. Price determination computing device 102 is operable to obtain forecasting model 392 from database 116, and execute forecasting model 392 to generate the predicted demand data.

In some examples, item price optimization model 394 identifies and characterizes a trained machine learning algorithm that, when executed, generates clearance price data. The clearance price data may identify a clearance price for an item for a particular store or website, for example. In other examples, item price optimization model 394 identifies and characterizes a discrete time stochastic control process, such as an MDP, that when executed generates clearance price data. Item price optimization model 394 may operate on one or more of the predicted demand data generated by forecasting model 392, modular date, a current inventory of the item at the particular store or website, and previous markdown prices for the item to generate the clearance price data.

In some examples, execution of the item price optimization model 394 generates a corresponding confidence value. The confidence value identifies a confidence level that by placing the item for sale at the suggested clearance price, the item will sell out (e.g., during a requested or determined time period).

In some examples, execution of item price optimization model 394 generates time period data indicating a time period of when the price of the item should be changed to the clearance price. For example, item price optimization model 394 may identify two different models, one of which generates clearance price data and another which generates time period data. In some examples, item price optimization model 394 identifies one model, and generates both clearance price data and time period data.

Price determination computing device 102 is operable to obtain item price optimization model 394 from database 116, and execute item price optimization model 394 to generate the clearance price data and/or time period data. Price determination computing device 102 may then transmit the clearance price data and/or time period data. For example, if determining a clearance price for an item sold at first store 109, price determination computing device 102 may generate first store price clearance data 310 identifying and characterizing the clearance price of the item, and may transmit first store price clearance data 310 to first store 109. The price of the item at first store 109 may then be updated to the received clearance price.

In some examples, if execution of item price optimization model 394 generates a confidence value that is not beyond a threshold (e.g., a preconfigured threshold), price determination computing device 102 determines that experimental data for the item is needed. For example, price determination computing device 102 may transmit the clearance price for the item to test stores that may be a subset of all stores for a retailer. The items may be placed for sale at the clearance price at the test stores for a test period (e.g., a number of days, a date range, etc.).

In some examples, items are place for sale at different subsets of test stores at various levels above or below the clearance price. For example, a first subset of test stores may place the item for sale at the clearance price, a second subset of test stores may place the item for sale at a percentage (e.g., 10%, 25%) above the clearance price, and a third subset of test stores may place the item for sale at a percentage (e.g., 10%. 25%) below the clearance price.

Sales data for purchase transactions of the item at the clearance price may then be transmitted to price determination computing device 102 from each test store during the test period, and price determination computing device 102 may update item experimental data 393 in database 116 with the sales data.

If determining a clearance price for an item sold at second store 111, price determination computing device 102 may generate second store price clearance data 314 identifying and characterizing the clearance price of the item, and may transmit second store price clearance data 314 to second store 111. The price of the item at second store 111 may then be updated to the received clearance price.

Likewise, if determining a clearance price for an item sold at a website hosted by web server 104, price determination computing device 102 may generate online price clearance data 305 identifying and characterizing the clearance price of the item, and may transmit online price clearance data 305 to web server 104. Web server 104 may update the price of the item to the received clearance price.

Figure 4:
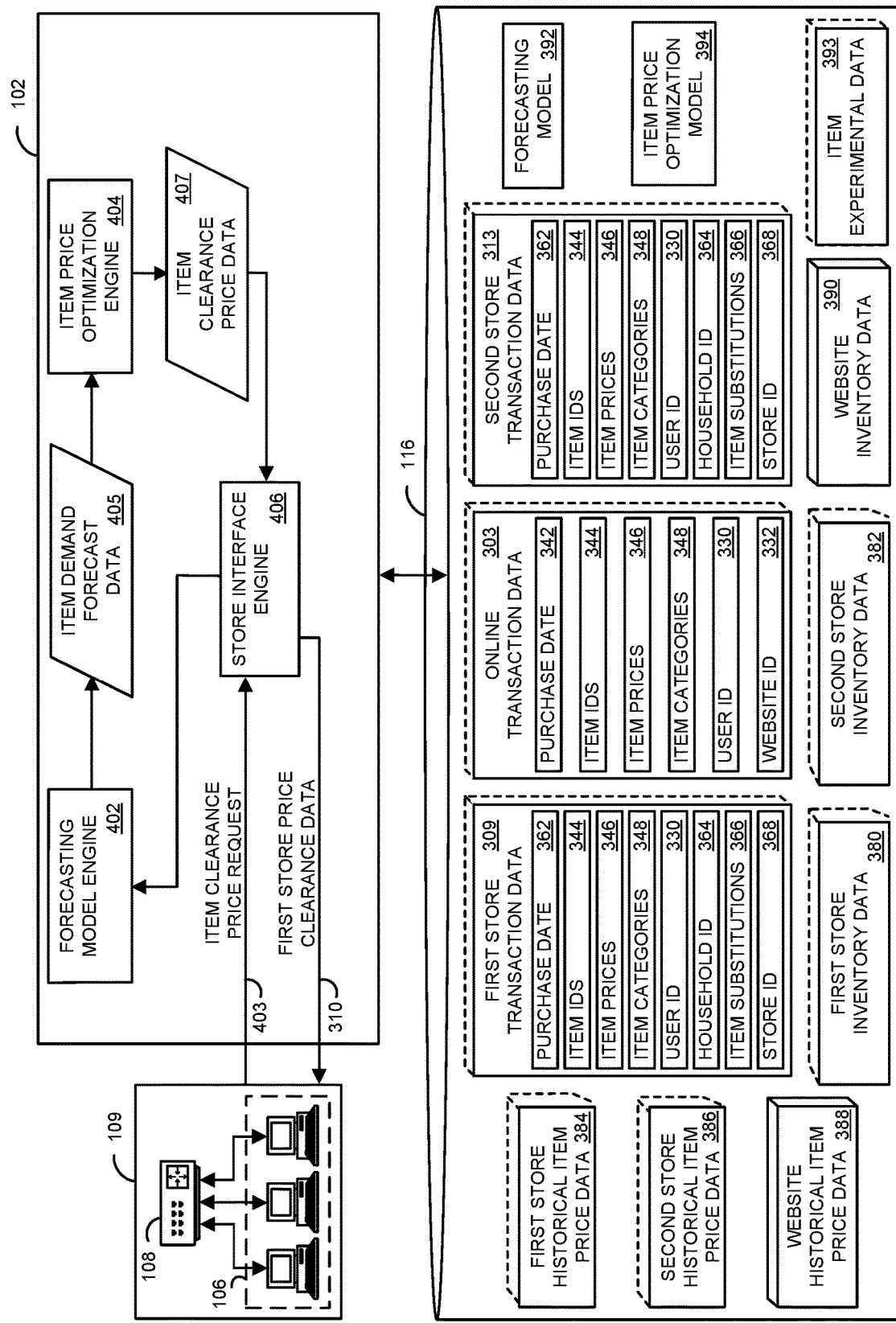
FIG. 4 is a block diagram illustrating examples of various portions of the price determination computing device of FIG. 1 in accordance with some embodiments.

FIG. 4 is a block diagram illustrating a more detailed view of price determination computing device 102. Specifically, price determination computing device 102 includes forecasting model engine 402, item price optimization engine 404, and store interface engine 406. In some examples, one or more of forecasting model engine 402, item price optimization engine 404, and store interface engine 406 are implemented in hardware. In some examples, one or more of forecasting model engine 402, item price optimization engine 404, and store interface engine 406 are implemented as an executable program maintained in a tangible, non-transitory memory, such as instruction memory 207 of FIG. 2, which may be executed by one or processors, such as processor 201 of FIG. 2. For example, forecasting model engine 402 may obtain from database 116 forecasting model 392, and may execute forecasting model 392. Similarly, item price optimization engine 404 may obtain from database 116 item price optimization model 394, and may execute item price optimization model 394.

In this example, first store 109 (e.g., via workstations 106) transmits an item clearance price request 403 to price determination computing device 102. Item clearance price request 403 identifies an item for which a clearance price is requested. In some examples, item clearance price request 403 further identifies one or more of a discount depth, a modular date, a current inventory level of the item at first store 109, and/or a time period for when the item is to be placed on clearance. Store interface engine 406 receives item clearance price request 403, and parses and extracts the data received. Store interface engine 406 provides to the forecasting model engine 402 the extracted data, which may include the item (e.g., via an item ID), a current inventory of the item, and the time period.

Forecasting model engine 402 can determine a predicted demand at first store 109 for the item based on the item and one or more of item experimental data 393, first store inventory data 380, and any received discount depth. Forecasting model engine 402 generates item demand forecast data 405 identifying and characterizing the predicted demand for the item at first store 109, and provides item demand forecast data 405 to item price optimization engine 404.

Item price optimization engine 404 can determine a price (e.g., clearance price) for the item based on item demand forecast data 405 and one or more of first store transaction data 320, first store historical item price data 384, a received modular date, and a received current inventory level of the item at first store 309. In some examples, item price optimization engine 404 further determines a time period as to when the determined price should be applied to the item. For example, item price optimization engine 404 may determine the time period based on the item and one or more of first store transaction data 320 and first store historical item price data 384. Item price optimization engine 404 generates item clearance price data 407 identifying and characterizing the determined price and/or time period, and can provide item clearance price data 407 to store interface engine 406.

Store interface engine 406 may receive item clearance price data 407, and package item clearance price data 407 into a data format (e.g., message) acceptable by first store 109 as identified by first store price clearance data 310. Store interface engine 406 transmits first store price clearance data 310 to first store 109. First store 109 may then update the price of the item to the received clearance price. For example, first store 109 may update the price of the item to the received clearance price during a time period identified in first store price clearance data 310.

Figure 5:
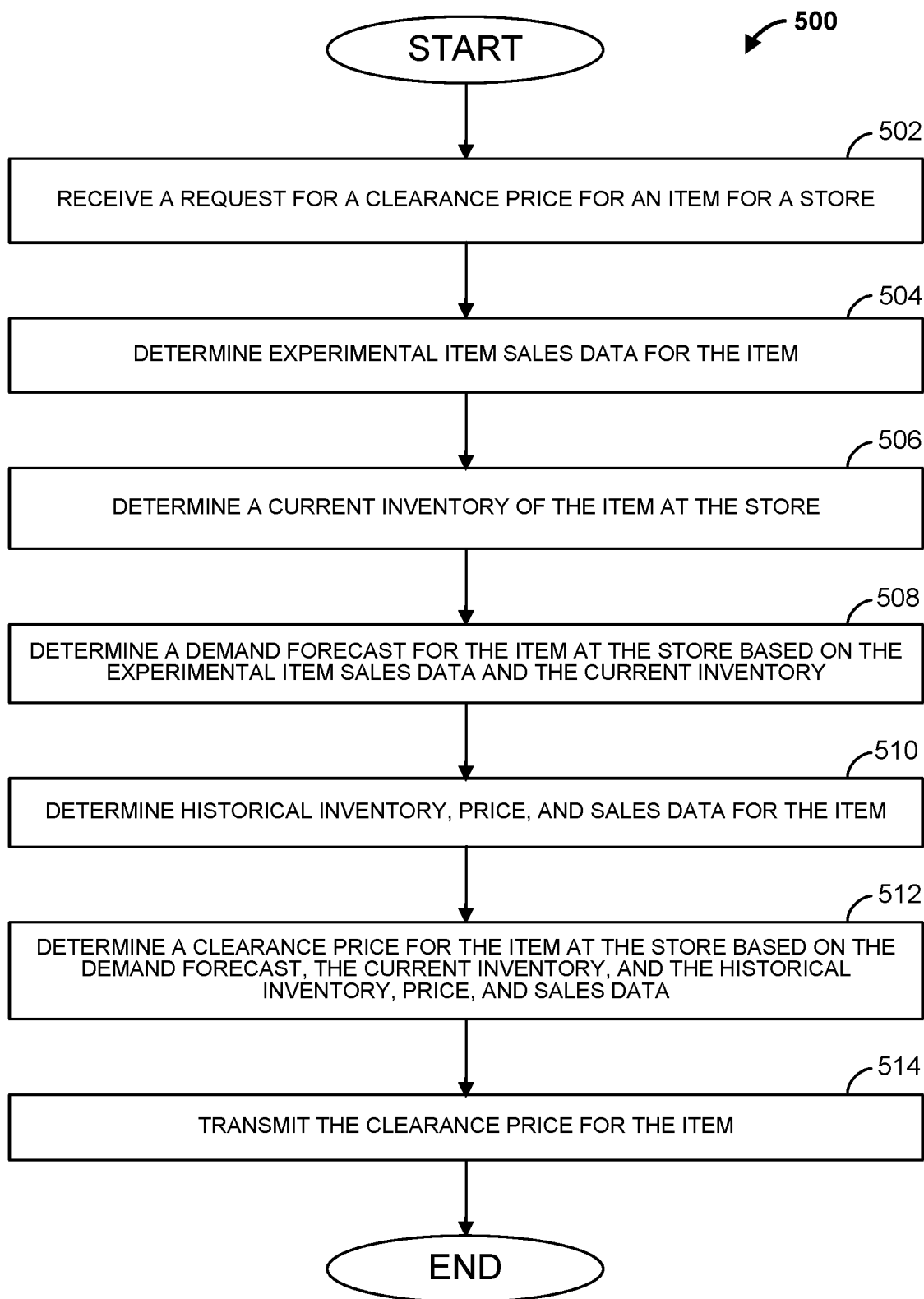
FIG. 5 is a flowchart of an example method that can be carried out by the price determination computing device of FIG. 2 in accordance with some embodiments.

FIG. 5 is a flowchart of an example method 500 that can be carried out by the item price determination system 100 of FIG. 1. Beginning at step 502, a request for a clearance price for an item at a store is received. For example, price determination computing device 102 may receive item clearance price request 403 from first store 109. At step 504, experimental item sales data is determined for the item. For example, price determination computing device 102 may obtain item experimental data 393 for the item from database 116. Item experimental data 393 may identify experimental sales and corresponding prices for the item. At step 506, a current inventory of the item at the store is determined. For example, the current inventory of the item at the store may be identified in the received request. In some examples, price determination computing device 102 may obtain first store inventory data 380 to determine the current inventory of the item at the store.

Proceeding to step 508, a demand forecast for the item at the store is determined. The demand forecast identifies a predicted demand for the item at the store. The demand forecast is determined based on the experimental item sales data and the current inventory. For example, price determination computing device 102 may execute forecasting model 392 to determine the demand forecast for the item at the store. At step 510, historical inventory, price, and sales data is determined for the item. For example, price determination computing device 102 may obtain first store historical item price data 384 and/or first store transaction data 320 from database 116, and parse out inventory, price, and sales data for the item.

At step 512, a clearance price for the item at the store is determined. The clearance price is determined based on the demand forecast generated at step 508, the current inventory of the item at the store, and the historical inventory, price, and sales data for the item. For example, price determination computing device 102 may execute item price optimization model 394 to determine a recommended clearance price for the item at the store. At step 514 the clearance price for the item is transmitted. For example, price determination computing device 102 may generate first store price clearance data 310 identifying the clearance price for the item at first store 109, and transmit first store price clearance data 310 to first store 109. The method then ends.

Figure 6A:
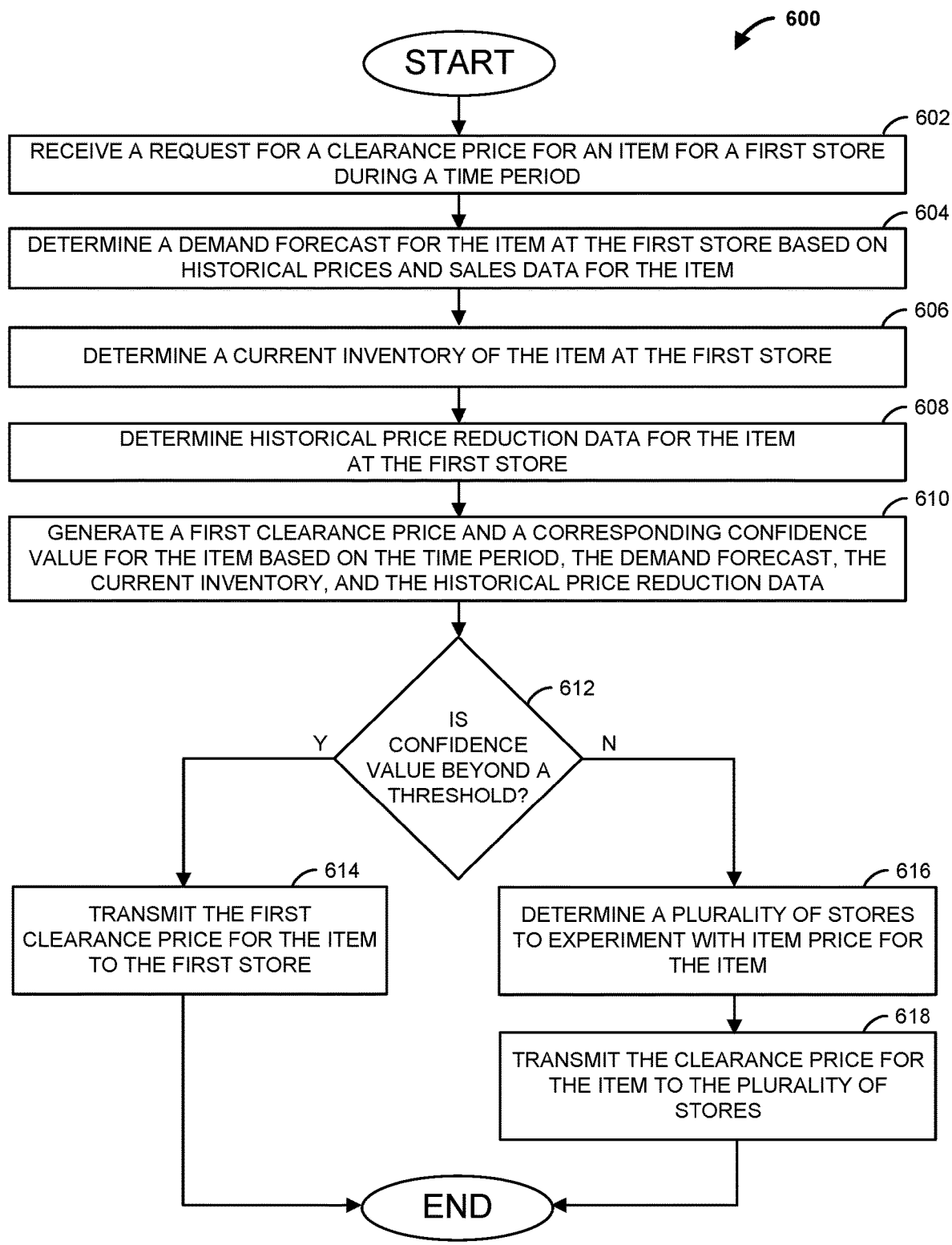
FIG. 6A is a flowchart of another example method that can be carried out by the price determination computing device of FIG. 2 in accordance with some embodiments.

FIG. 6A is a flowchart of another example method 600 that can be carried out by the item price determination system 100 of FIG. 1. Beginning at step 602, a request for a clearance price for an item at a first store during a time period is received. For example, price determination computing device 102 may receive item clearance price request 403 from first store 109, which identifies the item and the time period. At step 604, a demand forecast for the item at the first store is determined based on historical prices and sales data for the item. For example, price determination computing device 102 may obtain first store historical item price data 384 from database 116, and parse out price and sales data for the item. Price determination computing device 102 may then execute a trained machine learning algorithm, such as one identified and characterized by forecasting model 392, to generate item demand data for the item at the store. The item demand data identifies a predicted forecast for the item at first store 109.

Proceeding to step 606, a current inventory for the item at the first store is determined. For example, the current inventory of the item at the store may be identified in the received request. In some examples, price determination computing device 102 may obtain first store inventory data 380 to determine the current inventory of the item at the store. At step 608, historical price reduction data for the item at the first store is determined. Historical price reduction data may identify one or more price markdowns for the item at the first store. For example, price determination computing device 102 may obtain from database 116 first store historical item price data 384, and parse out price reduction data for the item.

At step 610, a first clearance price and a corresponding confidence value for the item at the first store is generated. The first clearance price and the corresponding confidence value may be generated based on the time period, the generated demand forecast, the current inventory of the item at the first store, and the historical price reduction data. For example, price determination computing device 102 may execute a machine learning algorithm identified and characterized by item price optimization model 394 stored in database 116 to generate the first clearance price and the corresponding confidence value.

At step 612, a determination is made as to whether the confidence value is beyond (e.g., above) a threshold. If the confidence value is beyond the threshold, the method proceeds to step 614, where the first clearance price for the item is transmitted to the first store. The method then ends.

Otherwise, if at step 612 the confidence value is not beyond the threshold (e.g., at or below the threshold), the method proceeds to step 616. At step 616, a plurality of stores are determined to experiment with item price for the item. For example, price determination computing device 102 may determine test stores where the item will be placed for sale at the first clearance price.

In some examples, price determination computing device 102 determines that the item is to be placed for sale at various levels above or below the clearance price. For example, a first subset of stores may place the item for sale at the clearance price, a second subset of stores may place the item for sale at a percentage (e.g., 10%, 25%) above the clearance price, and a third subset of stores may place the item for sale at a percentage (e.g., 10%. 25%) below the clearance price.

The method then proceeds to step 618, where the clearance price is transmitted to each of the plurality of stores. The method then ends.

Figure 6B:
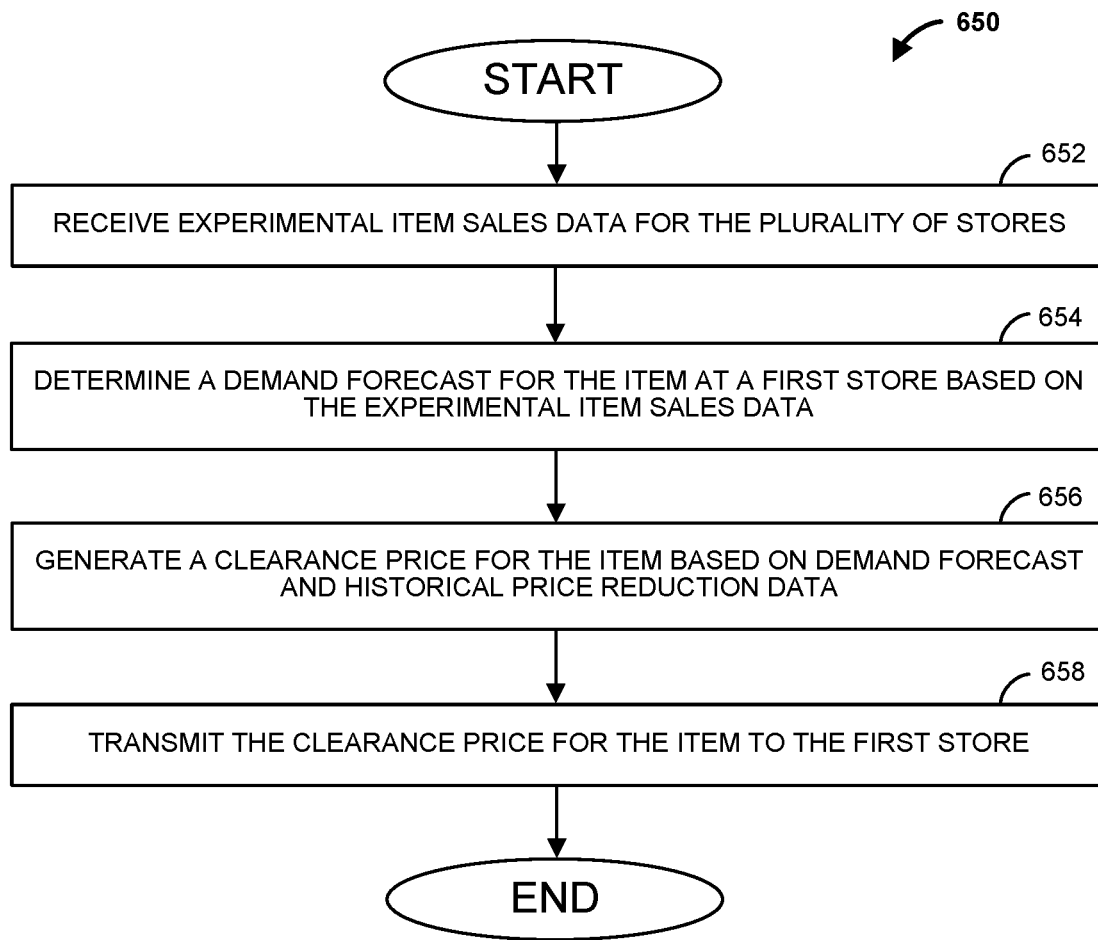
FIG. 6B is a flowchart of yet another example method that can be carried out by the price determination computing device of FIG. 2 in accordance with some embodiments.

FIG. 6B is a flowchart of another example method 650 that can be carried out by the item price determination system 100 of FIG. 1. Beginning at step 652, experimental item sales data for an item placed on sale at a plurality of stores (e.g., test stores) is received. For example, price determination computing device 102 may receive experimental item sales data from each of the plurality of stores determined at step 616 in FIG. 6A. The experimental item sales data from each store may identify sales of the item at a clearance price (e.g., during a time period).

At step 654, a demand forecast for the item at a first store is determined. The demand forecast is determined based on the experimental item sales data received from the plurality of stores. For example, price determination computing device 102 may execute forecasting model 392 to determine the demand forecast for the item at the first store.

At step 656, a first clearance price for the item at the first store is generated. The first clearance price may be generated based on the demand forecast and historical price reduction data for the item. For example, price determination computing device 102 may execute a machine learning algorithm identified and characterized by item price optimization model 394 stored in database 116 to generate the first clearance price.

Proceeding to step 658, the first clearance price is transmitted to the first store. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
    a computing device comprising:
    a user interface;
    a non-transitory computer readable medium storing instructions; and
    at least one processor communicatively coupled to the user interface and the non-transitory computer readable medium, the at least one processor configured to execute the instructions to:
    receive, from a first processor associated with a sales channel, a request for a price for an item at the sales channel for a period of time, wherein the sales channel is one of: a first store of a plurality of stores of a retailer, or a web site of an online marketplace for the retailer;

obtain experimental sales data for the item from a database, wherein the experimental sales data identifies: previous sales transactions for the item resulting from experimentally pricing the item at one or more levels;

obtain inventory data for the item from the database, wherein the inventory data identifies an amount of the item in inventory at the sales channel at each of the one or more levels, and a previous period of time of when each of the one or more levels was in effect;

determine a demand for the item at the sales channel for the period of time based on applying the experimental sales data and the inventory data as inputs to a first machine learning model to output the demand for the item, wherein the first machine learning model is trained with historical experimental transaction data identifying historical experimental sales of a first plurality of items;

determine a current inventory level of the item at the sales channel;

determine a price for the item at the sales channel and a confidence value corresponding to the price, based on applying all of: (a) the demand for the item output by the first machine learning model, (b) the current inventory level of the item at the sales channel, (c) the experimental sales data, (d) the period of time received in the request, and (e) an inventory level of the item during each of the previous sales transactions resulting from experimentally pricing the item at the one or more levels, as inputs to a second machine learning model to output the price for the item and the confidence value corresponding to the price, wherein the second machine learning model includes a reinforcement learning model with a set of parameters including, for each product j and each time step t:
a state $S_j$ representing a vector of feature values,
$a_j$ representing a price markdown percentage,
$r_j$ representing a reward value obtained based on revenue minus costs, and
$P_j$ representing a transition probability that price markdown percentage $a_j$ in state $S_j$ will lead to state $S_j'$, wherein the second machine learning model is trained with historical transaction data identifying historical sales of a second plurality of items based on:
computing an expected reward value Q based on adjusted values of the set of parameters given a policy $\pi$ representing a relationship between $S_j$ and $a_j$, wherein the set of parameters are initialized based on a random process and the historical transaction data,
adjusting values of the set of parameters to increase the expected reward value Q for next iteration,
recursively iterating the above steps of computing and adjusting over all products and all time steps, to derive an optimal policy $\pi^*$ that maximizes the expected reward value Q;

determine whether the confidence value is beyond a predetermined threshold;

transmit the price for the item to the first processor when the confidence value is beyond the predetermined threshold; and transmit, when the confidence value is not beyond the predetermined threshold, the price for the item to a plurality of processors located at a plurality of test stores respectively, wherein the plurality of test stores is a subset of the plurality of stores of the retailer.

2. The system of claim 1 wherein the request for the price for the item identifies a discount depth, and wherein the computing device is further configured to determine the demand for the item based on the discount depth.

3. The system of claim 1, wherein the experimental sales data comprises historical experimental sales of the item at a plurality of test stores at a plurality of prices.

4. The system of claim 1, wherein the request for the price for the item identifies a modular date, and wherein the computing device is configured to determine the price for the item based on the modular date.

5. The system of claim 1, wherein the computing device is configured to:
obtain historical price reduction data for the item from the database, wherein the historical price reduction data identifies one or more previous price markdowns for the item; and
determine the price for the item based on the historical price reduction data.

6. A method by at least one processor, the method comprising:
receiving, from a first processor associated with a sales channel, a request for a price for an item at a sales channel for a period of time, wherein the sales channel is one of: a first store of a plurality of stores of a retailer, or a web site of an online marketplace for the retailer;
obtaining experimental sales data for the item from a database, wherein the experimental sales data identifies previous sales transactions for the item resulting from experimentally pricing the item at one or more levels;
obtaining inventory data for the item from the database, wherein the inventory data identifies an amount of the item in inventory at the sales channel at each of the one or more levels, and a previous period of time of when each of the one or more levels was in effect;
determining a demand for the item at the sales channel for the period of time based on applying the experimental sales data and the inventory data as inputs to a first machine learning model to output the demand for the item, wherein the first machine learning model is trained with historical experimental transaction data identifying historical experimental sales of a first plurality of items;
determining a current inventory level of the item at the sales channel;
determining a price for the item at the sales channel and a confidence value corresponding to the price, based on applying all of: (a) the demand for the item output by the first machine learning model, (b) the current inventory level of the item at the sales channel, (c) the experimental sales data, (d) the period of time received in the request, and (e) an inventory level of the item during each of the previous sales transactions resulting from experimentally pricing the item at the one or more levels, as inputs to a second machine learning model to output the price for the item and the confidence value corresponding to the price,
wherein the second machine learning model includes a reinforcement learning model with a set of parameters including, for each product j and each time step t:
a state $S_j$ representing a vector of feature values, $a_j$ representing a price markdown percentage, $r_j$ representing a reward value obtained based on revenue minus costs, and $P_j$ representing a transition probability that price markdown percentage $a_j$ in state $S_j$ will lead to state $S_j'$, wherein the second machine learning model is trained with historical transaction data identifying historical sales of a second plurality of items based on:

computing an expected reward value Q based on adjusted values of the set of parameters given a policy $\pi$ representing a relationship between $S_j$ and $a_1$, wherein the set of parameters are initialized based on a random process and the historical transaction data, adjusting values of the set of parameters to increase the expected reward value Q for next iteration, recursively iterating the above steps of computing and adjusting over all products and all time steps, to derive an optimal policy $\pi^*$ that maximizes the expected reward value Q;

determining whether the confidence value is beyond a predetermined threshold;

transmitting the price for the item to the first processor when the confidence value is beyond the predetermined threshold; and transmitting, when the confidence value is not beyond the predetermined threshold, the price for the item to a plurality of processors located at a plurality of test stores respectively, wherein the plurality of test stores is a subset of the plurality of stores of the retailer.

7. The system of claim 1 wherein determining the demand for the item at the sales channel comprises executing a discrete time stochastic control process.

8. The system of claim 1 wherein determining the price for the item at the sales channel comprises executing a discrete time stochastic control process.

9. The system of claim 1 wherein the computing device is configured to:

obtain sales transaction data identifying sales transactions for the item at the plurality of test stores;

determine a second demand for the item based on the sales transaction data;

determine a second current inventory level of the item at the sales channel;

determine a second price for the item at the sales channel based on the second demand for the item and the second current inventory level of the item at the sales channel; and transmit the second price for the item.

10. The method of claim 6 wherein the request for the price for the item identifies a discount depth, and wherein the method further comprises determining the demand for the item based on the discount depth.

11. The method of claim 10 comprising:

obtaining sales transaction data identifying sales transactions for the item at the plurality of test stores;

determining a second demand for the item based on the sales transaction data;

determining a second current inventory level of the item at the sales channel;

determining a second price for the item at the sales channel based on the second demand for the item and the second current inventory level of the item at the sales channel; and transmitting the second price for the item.

12. A non-transitory computer readable medium having instructions stored thereon, wherein the instructions, when executed by at least one processor, cause a device to perform operations comprising:

receiving, from a first processor associated with a sales channel, a request for a price for an item at a sales channel for a period of time, wherein the sales channel is one of: a first store of a plurality of stores of a retailer, or a website of an online marketplace for the retailer;

obtaining experimental sales data for the item from a database, wherein the experimental sales data identifies previous sales transactions for the item resulting from experimentally pricing the item at one or more levels;

obtaining inventory data for the item from the database, wherein the inventory data identifies an amount of the item in inventory at the sales channel at each of the one or more levels, and a previous period of time of when each of the one or more levels was in effect;

determining a demand for the item at the sales channel for the period of time based on applying the experimental sales data and the inventory data as inputs to a first machine learning model to output the demand for the item, wherein the first machine learning model is trained with historical experimental transaction data identifying historical experimental sales of a first plurality of items;

determining a current inventory level of the item at the sales channel;

determining a price for the item at the sales channel and a confidence value corresponding to the price, based on applying all of: (a) the demand for the item output by the first machine learning model, (b) the current inventory level of the item at the sales channel, (c) the experimental sales data, (d) the period of time received in the request, and (e) an inventory level of the item during each of the previous sales transactions resulting from experimentally pricing the item at the one or more levels, as inputs to a second machine learning model to output the price for the item and the confidence value corresponding to the price, wherein the second machine learning model includes a reinforcement learning model with a set of parameters including, for each product j and each time step t:

a state $S_j$ representing a vector of feature values, $a_j$ representing a price markdown percentage, $r_j$ representing a reward value obtained based on revenue minus costs, and $P_j$ representing a transition probability that price markdown percentage $a_j$ in state $S_j$ will lead to state $S_j'$, wherein the second machine learning model is trained with historical transaction data identifying historical sales of a second plurality of items based on:

computing an expected reward value Q based on adjusted values of the set of parameters given a policy 7C representing a relationship between $S_j$ and $a_j$, wherein the set of parameters are initialized based on a random process and the historical transaction data, adjusting values of the set of parameters to increase the expected reward value Q for next iteration, recursively iterating the above steps of computing and adjusting over all products and all time steps, to derive an optimal policy $\pi^*$ that maximizes the expected reward value Q;

determining whether the confidence value is beyond a predetermined threshold;

transmitting the price for the item to the first processor when the confidence value is beyond the predetermined threshold; and transmitting, when the confidence value is not beyond the predetermined threshold, the price for the item to a plurality of processors located at a plurality of test stores respectively, wherein the plurality of test stores is a subset of the plurality of stores of the retailer.

13. The non-transitory computer readable medium of claim 12 having additional instructions stored thereon, wherein the additional instructions, when executed by the at least one processor, cause the device to perform additional operations comprising:

obtaining sales transaction data identifying sales transactions for the item at the plurality of test stores;

determining a second demand for the item based on the sales transaction data;

determining a second current inventory level of the item at the sales channel;

determining a second price for the item at the sales channel based on the second demand for the item and the second current inventory level of the item at the sales channel; and transmitting the second price for the item.

14. The non-transitory computer readable medium of claim 12 having additional instructions stored thereon, wherein the request for the price for the item identifies a discount depth, and wherein the additional instructions, when executed by the at least one processor, cause the device to perform additional operations comprising determining the demand for the item based on the discount depth.

* * * * *